No. 737,489. PATENTED AUG. 25, 1903.
B. L. ROBBINS.
COTTON PLANTER AND FERTILIZER DISTRIBUTER.
APPLICATION FILED SEPT. 6, 1902.
NO MODEL. 2 SHEETS—SHEET 1.
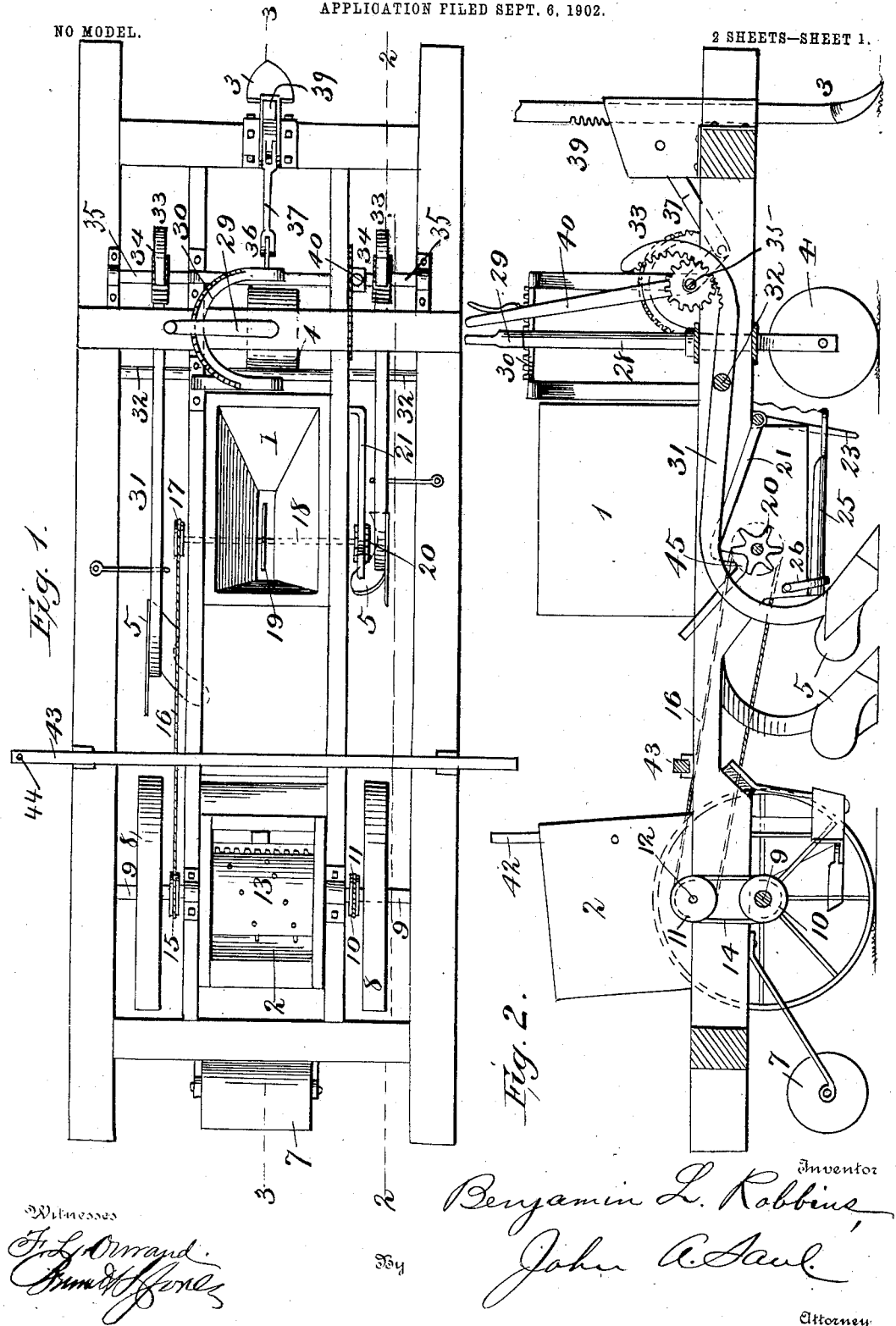

No. 737,489. PATENTED AUG. 25, 1903.
B. L. ROBBINS.
COTTON PLANTER AND FERTILIZER DISTRIBUTER.
APPLICATION FILED SEPT. 6, 1902.
NO MODEL. 2 SHEETS—SHEET 2.
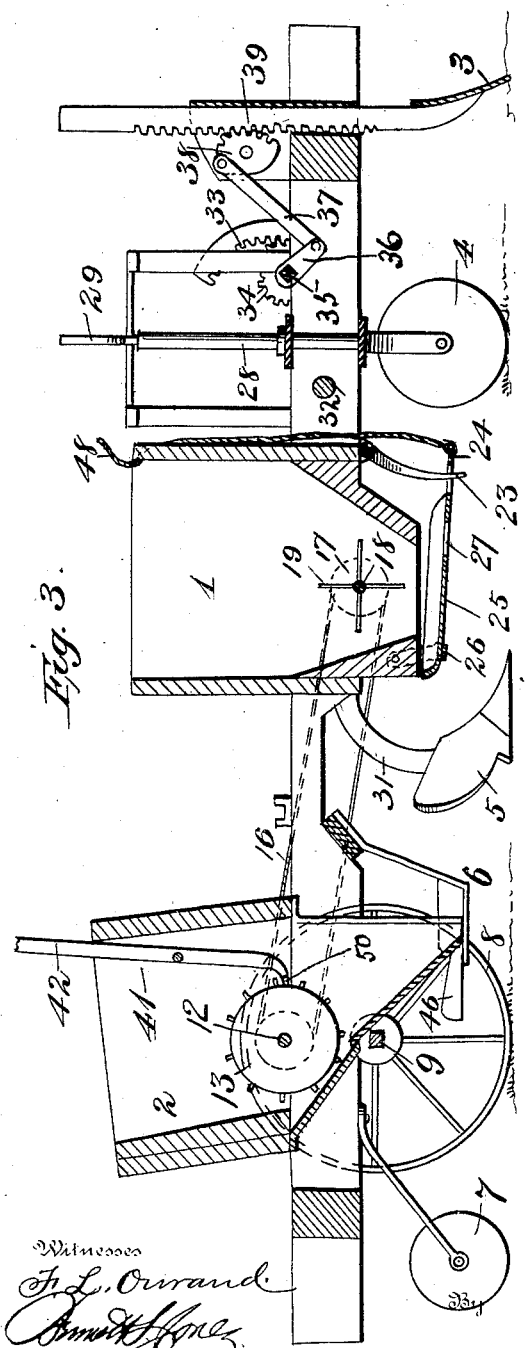
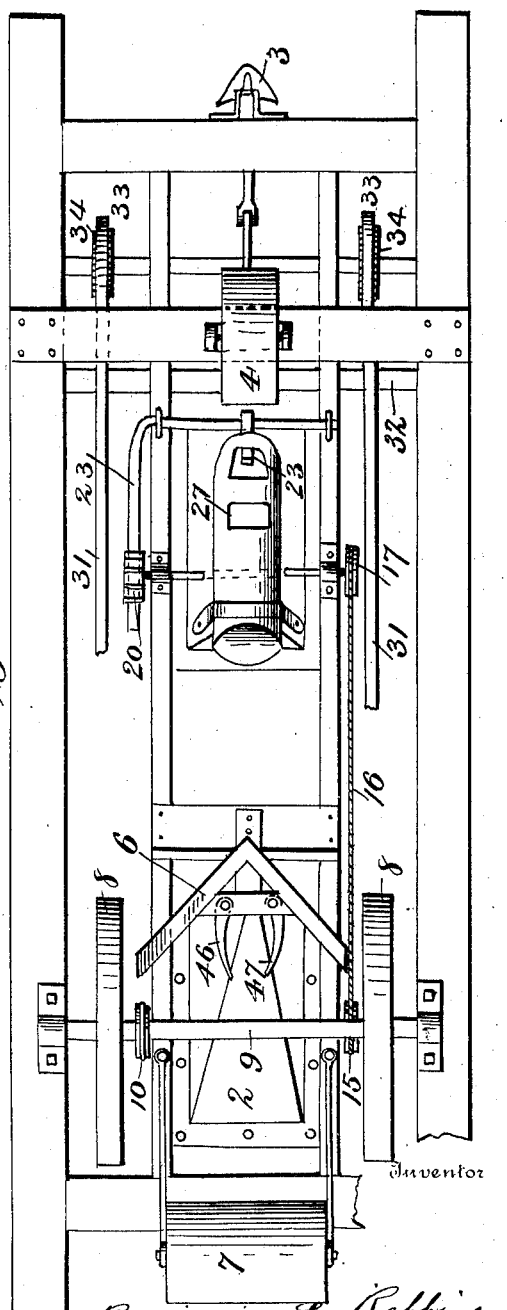

No. 737,489. Patented August 25, 1903.

UNITED STATES PATENT OFFICE.

BENJAMIN L. ROBBINS, OF PREGNALLS, SOUTH CAROLINA.

COTTON-PLANTER AND FERTILIZER-DISTRIBUTER.

SPECIFICATION forming part of Letters Patent No. 737,489, dated August 25, 1903.

Application filed September 6, 1902. Serial No. 122,411. (No model.)

*To all whom it may concern:*

Be it known that I, BENJAMIN L. ROBBINS, a citizen of the United States, residing at Pregnalls, in the county of Dorchester and State of South Carolina, have invented certain new and useful Improvements in Cotton-Planters and Fertilizer-Distributers, of which the following is a specification.

My invention relates to cotton-planters and fertilizer-distributers, and has for its object to so construct the same that by the operation of its various parts it will not only perform the various functions of feeding the fertilizer and seed and mark, open, and close the furrow, &c., but the various parts may be controlled by the simple manipulation of a lever.

In the drawings forming a part of this specification and in which like symbols of reference represent corresponding parts in the several views, Figure 1 is a plan view of the device. Fig. 2 is a vertical longitudinal section on the line 2 2, Fig. 1. Fig. 3 is a vertical longitudinal section on the line 3 3, Fig. 1; and Fig. 4 a bottom plan view.

1 represents the hopper adapted to receive the fertilizer; 2, the seed-hopper; 3, the furrow-opening plow; 4, a caster upon which the device is supported and guided; 5, the covering-plows; 6, a drill located beneath the seed-hopper and having coverers 46 and 47, and 7 a covering or pressure roller.

8 represents the wheels of the device, keyed or otherwise secured upon an axle 9; 10, a band-pulley on axle 9; 11, a pulley on shaft 12, and 13 an agitator within hopper 2, said agitator supported on the shaft 12. 14 is a band connecting pulleys 10 and 11, motion being communicated to the same from the drive-wheels by means of which the seed is fed from hopper 2. 15 is a pulley on the other end of the shaft 12, said pulley having connection by a band 16 with a pulley 17 on shaft 18, said shaft passing through hopper 1 and carrying an agitator 19. 20 is a sprocket-like wheel having large teeth located on the other end of shaft 18, and 21 is a lever pivoted in eyes 22 on the main frame.

23 is an arm or crank on lever 21, having engagement with an eye 24 in a shaking frame 25 on the bottom of hopper 1 to shake and distribute the fertilizer.

26 is a strap or the like connected to the bottom of hopper 1 and engaging and supporting frame 25, and 27 is an orifice in frame 25, through which the fertilizer is fed.

The frame 25 is reciprocated by means of lever 21, the lug or elbow 45, formed in lever 21, engaging wheel 20, thus agitating frame 25.

48 is a rope connected by an eye or the like to the top of the hopper and having connection with the shaking frame 25, the purpose of the same being to regulate or raise and lower the frame.

28 is a vertical rod, in the bottom of which caster 4 is journaled, said rod having a crank 29 to operate the same, and thus guide the machine.

30 is a rack-bar supported upon the main frame and in which the crank or lever 29 is adapted to be engaged and locked.

31 represents the shanks of the plows 5, the same being journaled on a shaft 32 and having arc-shaped racks 33, engaging pinions 34 upon a shaft 35. Upon shaft 35 is a lug 36, said lug having pivotal connection with a link 37, said link having a pivotal segment 38 on its outer end. The segment 38 is adapted to engage the rack-bar 39 on the shaft of the opening-plow 3.

40 is a lever on shaft 35, the object of the same being to elevate or depress the plows 3 and 5 simultaneously.

41 is a valve operated by a lever 42 to regulate the outlet of hopper 2, the same having a horizontal pivotal connection with the hopper, so that it may be oscillated to or from the stirrer.

43 is a graduated bar having a depending marker 44, the object of the same being to mark the next row to be operated upon.

50 represents recesses in the valve to receive the fingers of the stirrer.

The operation of the device is as follows: The horses or other power being connected to the front of the device, the lever 40 is operated to adjust the plows as desired, the lever 42 is operated to feed the seed as desired, and the shaking frame is regulated by the manipulation of rope 48.

Having now fully described my invention, what I claim as new, and desire to secure by Letters Patent, is—

1. In a device of the character described, the combination with the plows having arc-shaped racks upon their shanks, of a journal supporting said plows, pinions engaging said racks, and a lever to operate the pinions.

2. In a device of the character described, the combination with the plows, of a journal supporting said plows, a main shaft having a rack-and-pinion connection with the plows, a furrow-opener also connected with the shaft, a lever connected to the shaft, and locking means for the lever.

3. In a device of the character described, the combination with the plows, of a journal supporting said plows, a furrow-opener having a rack-bar formed on its shank, a main shaft having a rack-and-pinion connection with the plows, an arm supported upon said shaft and having a linked connection with a segment engaging the rack-bar of the furrow-opener, and a lever connected to the shaft, by means of which the plows and furrow-opener may be elevated or depressed.

In testimony whereof I affix my signature in presence of two witnesses.

BENJAMIN L. ROBBINS.

Witnesses:
H. J. SWEENEY,
JOHN A. SWEENEY.